United States Patent Office 2,963,965
Patented Dec. 13, 1960

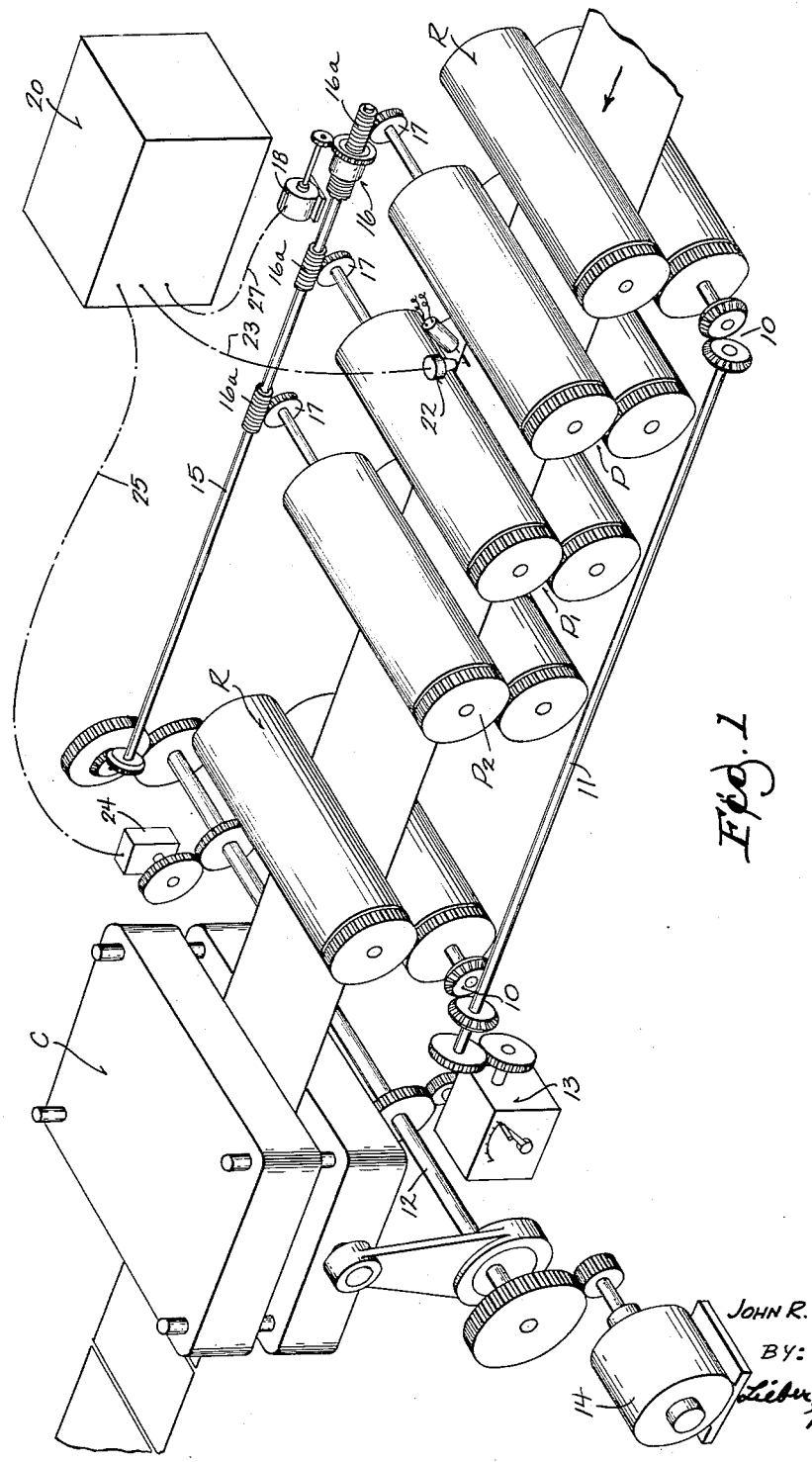

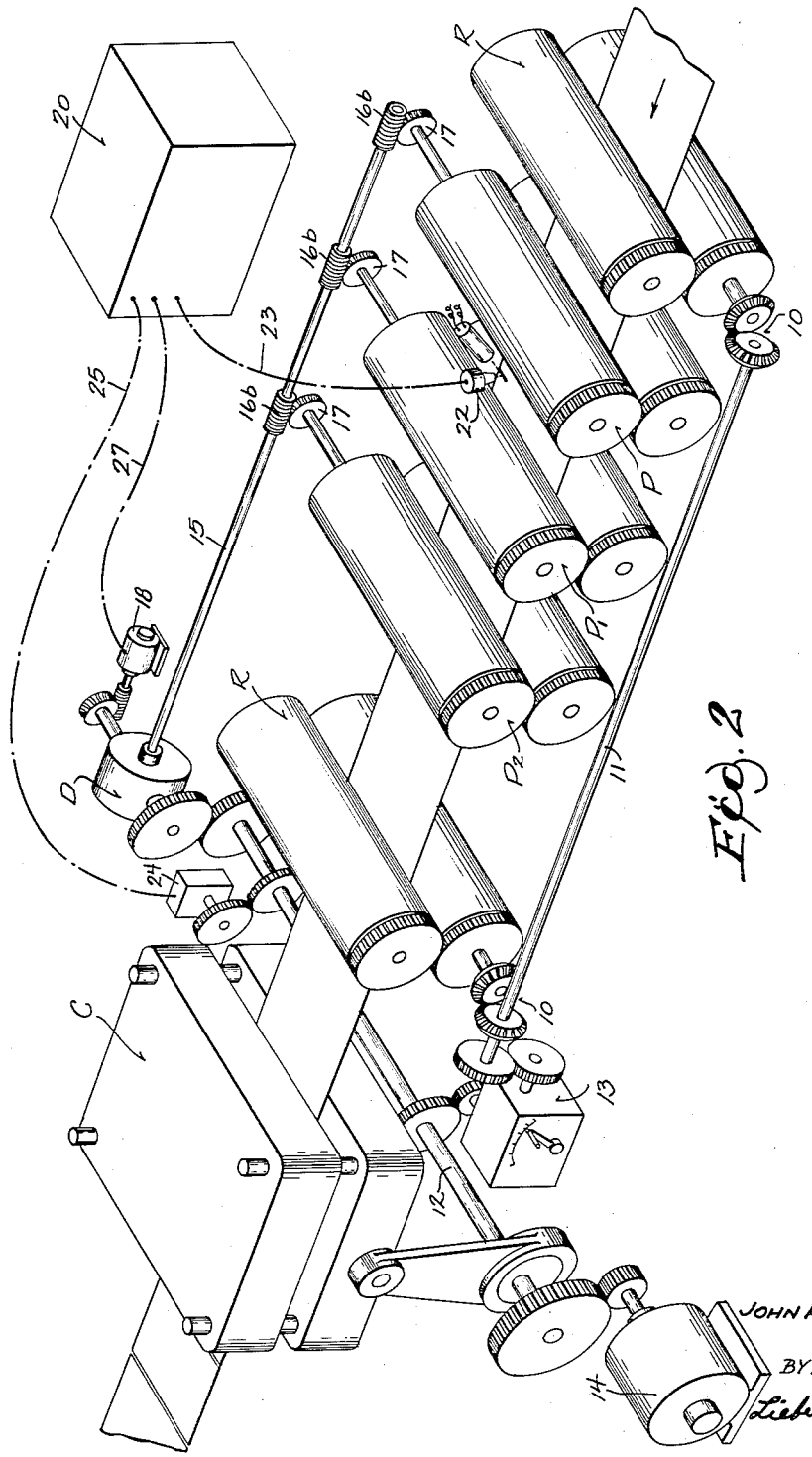

2,963,965

AUTOMATIC REGISTRY CONTROL SYSTEM AND METHOD FOR PRINTING AND CUTTING A WEB

John R. Baumgartner, Milwaukee, Wis., assignor to Mercury Engineering Corporation, a corporation of Wisconsin Filed June 5, 1959, Ser. No. 818,343

4 Claims. (Cl. 101—227)

This invention relates generally to a method and control system for performing successive operations such as printing and cutting, on a rapidly moving web of paper, or the like. More particularly, the invention relates to a particularly arranged control system and method for effecting automatic registry of a printing cylinder relative to the cutter.

Apparatus of the general character to which this invention relates comprise printing rolls, a cutter, and feed rolls for moving the web through the printers and cutter. Sooner or later these various elements drift out of registry due to various factors, such as for example, tension variation, printing variations, or dimensional changes of the web caused by drying in the printing process. This rate of run-out or drift may be small but it is generally cumulative, and the amount increases with the length of web consumed. Therefore various systems have heretofore been used which utilize web scanners, selector switches, control panels and correcting motors for automatically correcting these variables. One use of such a system is shown in the U.S. Patent 2,812,938, issued on November 12, 1957.

In machines of this type, the feed or metering rolls are precisely adjusted to feed a definite length of the web into the cutter for each stroke of the cutter. Once this initial set-up between the feed rolls and the cutter has been made for any one operation, to give a sheet of definite length, it is highly desirable to not be required to subsequently adjust the setting of either the cutter or feed rolls. In other words, after the initial set-up between the feed rolls and cutter has been made, it is important to have precisely the same amount or length of web fed into the cutter or punch press for every cycle, and without the necessity of adjusting this set-up. Heretofore, however, many proposals have been made and are in commercial use for maintaining registry between the cutter and printing cylinder by the use of detector systems which cause adjustment of the cutter itself or of the feed rolls. It has been conventional practice to periodically adjust the cutter or feed rolls relative to the printer, and the resulting variations in the finished sheet lengths have been taken care of by a subsequent trimming operation.

Registry control systems heretofore have been a compromise, at best, but with the advent of more expensive web material, such as for example, tinplate, the problem of waste has become critical. For example, assume that because of the necessity for adjusting the length of the finished sheets, either by adjusting the cutter or the feed rolls, an error of $1/64$ of an inch in a finished sheet occurs. In addition to this error caused by keeping the cutter in time with the printed matter on the web, suppose the inherent error in the cutter itself was on the order of $1/64$ of an inch per sheet, making a total error of $1/32$ of an inch. To this total error must be added an overfeed in the length of the sheet on the order of $1/32$ of an inch to allow for the trimming operation itself. Thus a total of $1/16$ of an inch must be trimmed to allow for inherent error of the cutter (if there is any) and color correction. This amount of trim becomes of considerable magnitude over a relatively short period of operation.

Accordingly, the present invention provides an improved registry system for printing and cutting apparatus in which it is unnecessary to adjust the cutter or the feed rolls, but instead the printing cylinder is adjusted or phased relative to the cutter. In this manner, if there is no inherent error in the cutter itself, trimming of the finished sheets is eliminated.

More specifically, the present invention contemplates a system of the above type in which a web scanner such as a photo-electric eye is placed directly behind the first printing cylinder and a phase detector such as a selector switch is placed on the cutter, the signals from both the scanner and selector switch being compared in a control panel to determine their relationship, and the control panel then actuates a correcting motor which in turn advances or retards the printing cylinder to maintain it in phase with the cutter. Stated otherwise, when the phase relationship is incorrect between the cutter and printing cylinder, as determined by the signals fed into the control panel by the web scanner and the selector switch, rather than disturb the amount of web being metered into the cutter, the position of the printing cylinder is corrected by the control box actuated correcting motor, and in reference to the cutter. In this manner the scanning is done back of the cylinder where the correction can immediately be made.

In a multi-cylinder printing press, for example, in a multi-color operation, the scanner head is placed immediately after the first color cylinder and the phase selector is placed at the cutter. By matching the signals of the scanner and selector, a master or key color is provided on the web to which the other cylinders may be referenced. This may be referred to as color-to-cut control.

The invention also provides a method for maintaining registry between a printer and a cutter operating on a single running web, in which the web is metered by fixed lengths into the cutter, and any mis-registry is corrected by phasing the printer relative to the cutter. More specifically, the method contemplates that the mark placed on the web by the printer is compared with the position of the cutter, and the printer is adjusted when mis-registry occurs.

These and other objects and advantages of this invention will appear later as this disclosure progresses, reference being had to the accompanying drawings in which:

Figure 1 is a perspective and generally schematic view of a printing and cutting apparatus embodying this invention;

Figure 2 is a view similar to that shown in Figure 1, but being of a modification.

Referring more particularly to the drawings, a cutter C may be of any conventional type, such as for example, the punch press shown and described in my U.S. Patent Number 2,638,821, issued on May 19, 1953. Alternatively, the cutter may be of the cylindrical or rotary knife type which are also of well known construction and need no description here.

Feed rolls R are drivingly connected by suitable bevel gears 10 and shaft 11 with the drive shaft 12 of the cutter through any suitable adjusting means 13. The drive shaft 12 may be driven by a motor 14 or other suitable means. The adjusting means 13 is provided between the feed rolls and the cutter so as to initially determine the amount of web W that will be fed into the cutter for any one stroke or cycle. This means 13 for determining the length of the sheets may be of the change gear type or other speed change means of the positive drive type. Thus the feed rolls are driven in synchronism with the cutter. In accordance with the present invention, once this feed roll-cutter relationship has been established for any one operation, this setting need not be subsequently adjusted, and this is important.

The printing cylinders P, P1 and P2 are each suitably connected to a common drive shaft 15 by means of a running register 16 which includes an adjustable worm 16a on the common shaft, which worms engage their respective worm pinion 17 mounted on the printing cylinder shafts. Only one of these running registers have been shown and only schematically, but it will be understood that they may be operated either manually or by a correction motor, as will appear. For a more detailed description of this general adjustment between the drive shaft and cylinders, reference may be had if deemed necessary or desirable, to the co-pending U.S. application Serial Number 663,939, filed June 6, 1957, now Patent No. 2,930,319, issued on March 29, 1960, and entitled "Printing Press." It is believed sufficient to say, for purposes of this disclosure, however, that the worm 16a is adjustable axially on the shaft 15 to vary the relationship between the cylinder and common drive shaft.

In the embodiment of the invention as shown in Figure 1, a conventional control panel box 20 is provided for actuating the register 16 of the "key" printing cylinder P through a reversible correcting motor 18, as will more fully appear hereinafter. The worms 16a of the other printing cylinders P1 and Pa are separately adjusted either manually or by another control box and other correcting motors, as mentioned later. In any event cylinders P1 and P2 are adjusted in reference to the first color or print applied by the "key" cylinder P in this embodiment of the invention.

For a more detailed description of the printing cylinders themselves and how they cooperate generally with their respective impression cylinders, reference may be had to the co-pending U.S. application Serial Number 705,059, filed December 24, 1957, now Patent No. 2,929,-317, which issued on March 22, 1960.

The web scanner 22 is illustrated as being of the photo-electric tube type, although it may be of other conventional types, and it is located immediately behind the first printing cylinder P where it scans the print made by this cylinder. It should be noted that the scanner uses the mark placed on the web by the first cylinder P for detecting the relative position of the web. The scanner receives impulses from the mark or "target" and fires a signal to the panel box 20 through wiring indicated schematically by line 23, whenever a certain mark of the printing on the web passes by. By having the scanner located immediately adjacent and behind the first printing cylinder, which cylinder provides the key printing on the web, the correcting adjustment of this cylinder takes place in accordance with the condition on the web at that first cylinder.

A conventional phase detector in the form of a selector switch 24 is located at the cutter C and serves to detect the relative position of the cutter, that is, it indicates when the knife itself is at a certain predetermined position in its cycle. This phase detector 24 shown as a photo electric selector switch, fires a signal to the control panel box 20 through wiring indicated schematically by line 25, when the cutter is in a certain predetermined position.

The scanner 22, phase detector 24 and panel box 20 are all of well known design and as they form no part of the present invention, per se, a detailed description of them is deemed neither necessary or desirable for purposes of this disclosure. It is believed sufficient to say that they may be of the general type shown in the Sorkin Patent Number 2,348,862, issued on May 16, 1944, or of the type readily available commercially from General Electric.

When the phase relationship between the signals received in the panel box 20 from the scanner 22 and the phase detector 24 is incorrect, that is, when the two signals do not match, it indicates an error in the desired relative position between the printed web and the cutter. When this occurs, the electronic panel box 20 directly and precisely sends a corrective impulse through the wiring indicated schematically as line 27, to turn the reversible correcting motor 18 in either direction. The motor in turn either advances or retards the register 16 of printing cylinder P, depending on the direction in which the signals are out of phase.

In the Figure 1 system, after the first printing cylinder has been thus adjusted, as previously mentioned, the other cylinders would be conventionally adjusted relative thereto by reference to the printing of the first cylinder P, and through a conventional color-to-color registration system utilizing another control cabinet and signalling means (not shown), but such an arrangement is shown in the said Patent Number 2,348,862.

In the modified system shown in Figure 2, all of the printing cylinders are simultaneously adjusted through their differentials formed by worm 16b and pinion gear 17, by means of a differential D which is located in the common shaft 15. This differential is adjusted in one direction or the other to advance or retard the printing cylinders relative to the web, by the correcting motor 18. The motor 18 and control box 20 function in the same manner as in the Figure 1 system.

*Set-up and operation*

To set up the apparatus for a given operation, the machine is run briefly so that the web is printed by the first cylinder to give a reference print or mark on the web. The machine is then stopped and the reference mark is then manually positioned relative to the knife, by the adjusting means 13, so that the cutter, that is, the knife itself, precisely registers with the mark. Then the scanner 22 is set on its reference mark and thus referenced to the web. The phase detector is then set to its point on the knife where it also sends a signal to the control box. This is then the starting point at which everything is in alignment and the two signals received by the cabinet balance each other out in the known manner so as to send no corrective impulse to the correction motor.

*General*

If a drift occurs, in one direction or the other, the control box receives a corresponding signal and actuates the correcting motor in a proper direction to adjust the printing cylinder P, in the Figure 1 set-up, or all of the printing cylinders together, as in the Figure 2 modification.

In either embodiment of the invention shown, the printing cylinder is phased in relationship to the cutter and in this respect "color-to-cut" registration has been provided.

The cutter adjustment relative to the feed of web thereto remains unchanged, as does the amount of web metered to the cutter for each cycle.

As a result, the only trim required of a sheet is that due to the inherent error in the cutter itself, if any.

Various modes of carrying out the invention are contemplated as being within the scope of the following claims particularly pointing out and distinctly claiming the subject matter which is regarded as the invention.

What is claimed and desired to be secured by Letters Patent is:

1. Apparatus including a printer and a cutter to print and then cut a single web, feed rolls for metering a fixed length of web to said cutter for each cut thereof, a running register for adjusting said printer, a reversible correction motor connected to said register for advancing or retarding said printer; and a registry control system for operating said motor and comprising, a phase detector cooperating with said cutter for determining the position of the latter, and a web scanner located behind said printer for cooperating with the printed matter placed on said web by said printer, said system detecting deviation between said cutter and printer from true register and supplying corrective increments of power to drive said motor in a correcting direction.

2. In combination, a printer and a cutter which operate on a single web, feed rolls for successively metering definite and fixed lengths of web to said cutter, a running register connected with said printer for reversible adjustment thereof, a reversible correction motor connected to said register for advancing or retarding said printer; and a registry control system for operating said motor and comprising, a phase detector cooperating with said cutter for determining the position of the latter, a photo-electric web scanner located behind said printer for cooperating with the printed matter placed on said web by said printer, an electric control panel box for receiving impulses from said detector and scanner whereby said system detects deviation between said cutter and printer from true register and supplies corrective increments of power to drive said motor in that direction which tends to restore registration.

3. The method of controlling a printer and a cutter having a web running therethrough comprising, printing a mark on said web with said printer, feeding successive and fixed lengths of printed web into the cutter, comparing the position of the cutter and said mark for detecting deviation of registry between said cutter and printer, correcting the position of the printer to bring it into registry with said cutter, and maintaining the relationship between the cutter and feed rolls constant.

4. With a multi-color printing press machinery having a plurality of successively operating printers to imprint a traveling web with differently colored impressions of which the first one includes a key color while the subsequent impressions are superimposed on the first one, the combination of a cutter successively cutting said web after it passes through said printers, feed rolls for metering a fixed length of web to said cutter for every cycle thereof, a running register for adjusting the first printer, a reversible correction motor connected to said register for advancing or retarding said first printer; a registry control system for operating said motor and including a phase detector cooperating with said cutter for determining the position thereof, and a web scanner located behind said first printer for cooperating with said key color, said system utilizing impulses from said detector and said scanner to detect deviation from true registry between said cutter and printer and to supply corrective increments of power to drive said motor in that direction which tends to restore registration.

References Cited in the file of this patent

UNITED STATES PATENTS

| | | |
|---|---|---|
| 2,105,185 | Degan | Jan. 11, 1938 |
| 2,195,006 | Guliksen | Mar. 26, 1940 |
| 2,289,737 | Sorkin | July 14, 1942 |
| 2,518,324 | Hurley | Aug. 8, 1950 |
| 2,529,161 | Kelling et al. | Nov. 7, 1950 |
| 2,632,855 | Bendz | Mar. 29, 1953 |
| 2,888,260 | Schowerer | May 26, 1959 |